(12) United States Patent
King

(10) Patent No.: US 10,918,003 B2
(45) Date of Patent: Feb. 16, 2021

(54) TURF AERATORS AND ASSEMBLIES FOR SAME

(71) Applicant: BRIGGS & STRATTON CORPORATION, Wauwatosa, WI (US)

(72) Inventor: Brandon King, Pleasant Hill, MO (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 134 days.

(21) Appl. No.: 16/373,358

(22) Filed: Apr. 2, 2019

(65) Prior Publication Data

US 2019/0297768 A1    Oct. 3, 2019

Related U.S. Application Data

(60) Provisional application No. 62/651,875, filed on Apr. 3, 2018.

(51) Int. Cl.
*A01B 45/02* (2006.01)

(52) U.S. Cl.
CPC .................. *A01B 45/023* (2013.01)

(58) Field of Classification Search
CPC ....... A01B 45/00; A01B 45/02; A01B 45/023; A01B 45/026
See application file for complete search history.

(56) References Cited

U.S. PATENT DOCUMENTS

| | | | | |
|---|---|---|---|---|
| 3,384,139 A | * | 5/1968 | Schnell | B02C 18/06 241/47 |
| 3,477,233 A | * | 11/1969 | Andersen | F04D 35/00 405/79 |
| 3,743,025 A | * | 7/1973 | Thatcher | A01B 45/023 172/21 |
| 6,892,821 B2 | * | 5/2005 | Wessel | A01B 45/023 172/22 |
| 2005/0006110 A1 | * | 1/2005 | Wessel | A01B 45/023 172/22 |
| 2010/0083628 A1 | * | 4/2010 | Humphrey | A01B 45/026 56/249.5 |
| 2016/0095273 A1 | * | 4/2016 | Merkt | A01B 45/00 172/4.5 |
| 2016/0227702 A1 | * | 8/2016 | Lietaer | A01C 5/064 |
| 2019/0289766 A1 | * | 9/2019 | King | A01B 45/023 |
| 2019/0297768 A1 | * | 10/2019 | King | A01B 45/023 |
| 2020/0113114 A1 | * | 4/2020 | Kinkead | A01M 7/00 |

OTHER PUBLICATIONS

Billy Goat Turf Aerator Manual, 14 pages. (May 17, 2005).

* cited by examiner

*Primary Examiner* — Jamie L McGowan
(74) *Attorney, Agent, or Firm* — Foley & Lardner LLP

(57) ABSTRACT

A turf aerator includes a frame, a tine crank having a clearing end with threads, a plurality of tines coupled to the tine crank, and a coupling for fastening the tine crank clearing end to the frame. The coupling includes a collar area for receiving the tine crank clearing end, an anchor plate for selectively fastening to the frame, and an opening sized for accessing the threads of the tine crank clearing end. The turf aerator further includes an actuator threaded complementary to the threads of the tine crank clearing end for selectively moving the coupling from an extended position relative to the tine crank to a retracted position relative to the tine crank.

20 Claims, 10 Drawing Sheets

TURF AERATORS AND ASSEMBLIES FOR SAME

CROSS-REFERENCE TO RELATED PATENT APPLICATIONS

This application claims the benefit of U.S. Application No. 62/651,875, filed Apr. 3, 2018, which is incorporated herein by reference in its entirety.

FIELD OF THE INVENTION

Aerators are commonly used to improve turf quality by driving sets of coring tines into the ground to remove soil (often in cylindrical portions referred to as "plugs"). This counteracts soil compaction by creating cavities that permit water and other nutrients to better reach the roots of the remaining grass, and thereby promotes the overall health of the turf. Embodiments of the current disclosure advance the aerator art.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a turf aerator includes a frame, a tine crank having a clearing end with threads, a plurality of tines coupled to the tine crank, and a coupling for fastening the tine crank clearing end to the frame. The coupling has a collar area for receiving the tine crank clearing end, an anchor plate for selectively fastening to the frame, and an opening sized for accessing the threads of tine crank clearing end. An actuator is threaded complementary to the threads of the tine crank clearing end for selectively moving the coupling from an extended position relative to the crank to a retracted position relative to the tine crank.

In another embodiment, a turf aerator includes a frame, a tine crank having a clearing end with internal threads, a plurality of tines coupled to the tine crank, and a coupling for fastening the tine crank clearing end to the frame. The coupling has a collar area for receiving the tine crank clearing end, an anchor plate for selectively fastening to the frame, and an opening sized for accessing the threads of the tine crank clearing end. A bolt is threaded complementary to the threads of the tine crank clearing end for selectively moving the coupling from an extended position relative to the tine crank to a retracted position relative to the tine crank.

In another embodiment, a tine assembly for use with a turf aerator includes a tine crank having a clearing end with threads and an opposite pivoting end, and a coupling for fastening the tine crank clearing end to a frame of the turf aerator. The coupling includes a collar area for receiving the tink crank clearing end, an anchor plate for selectively fastening to the frame, and an opening sized for accessing the threads of the tine crank clearing end. The tine assembly further includes an actuator threaded complementary to the threads of the tine crank clearing end for selectively moving the coupling from an extended position relative to the tine crank to a retracted position relative to the tine crank.

DETAILED DESCRIPTION

Figure 1:
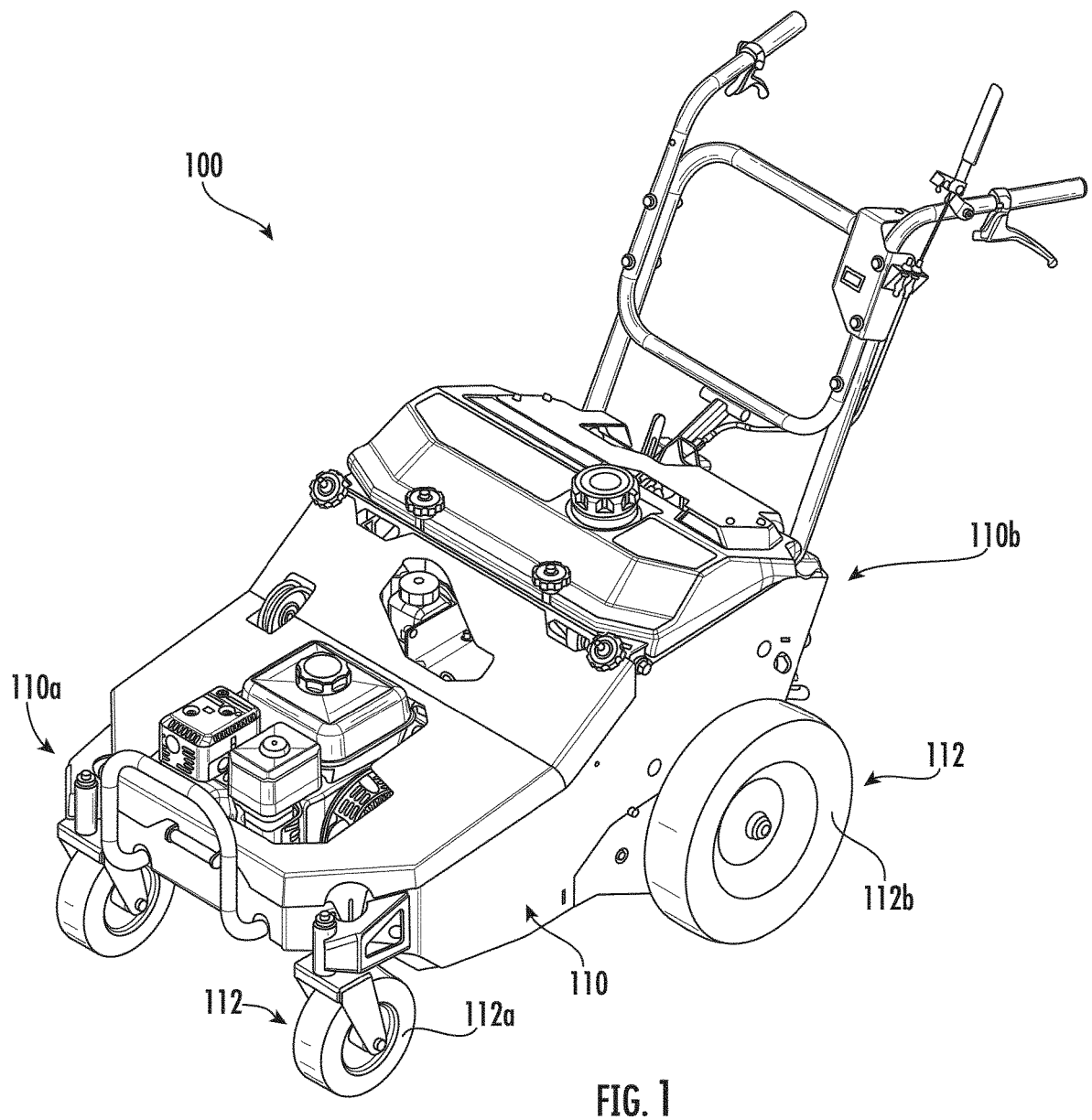
FIG. 1 is a perspective view of an aerator according to one embodiment of the current disclosure, shown with the tine assembly at a retracted position.
Figure 2:
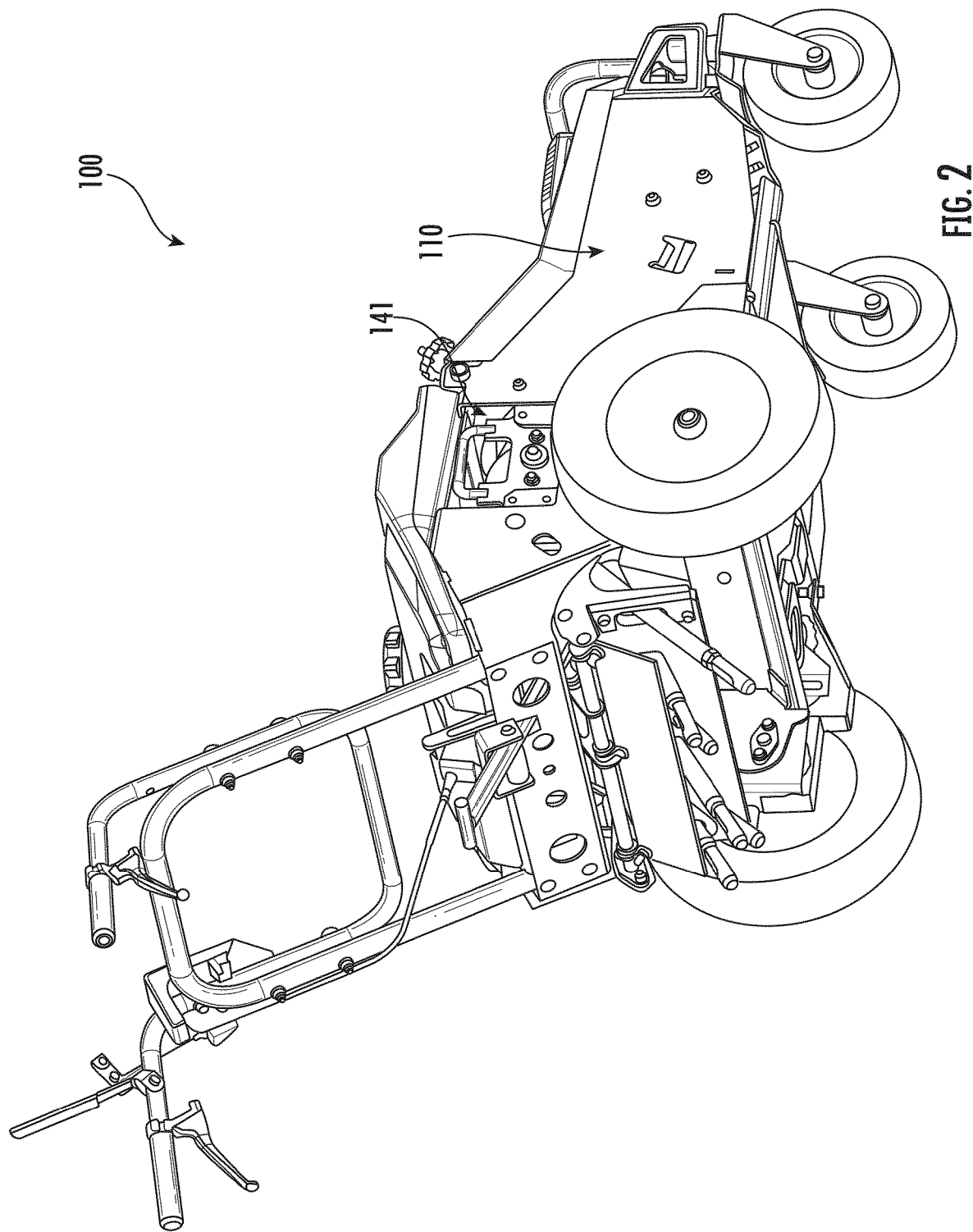
FIG. 2 is another perspective view of the aerator of FIG. 1.
Figure 3A:
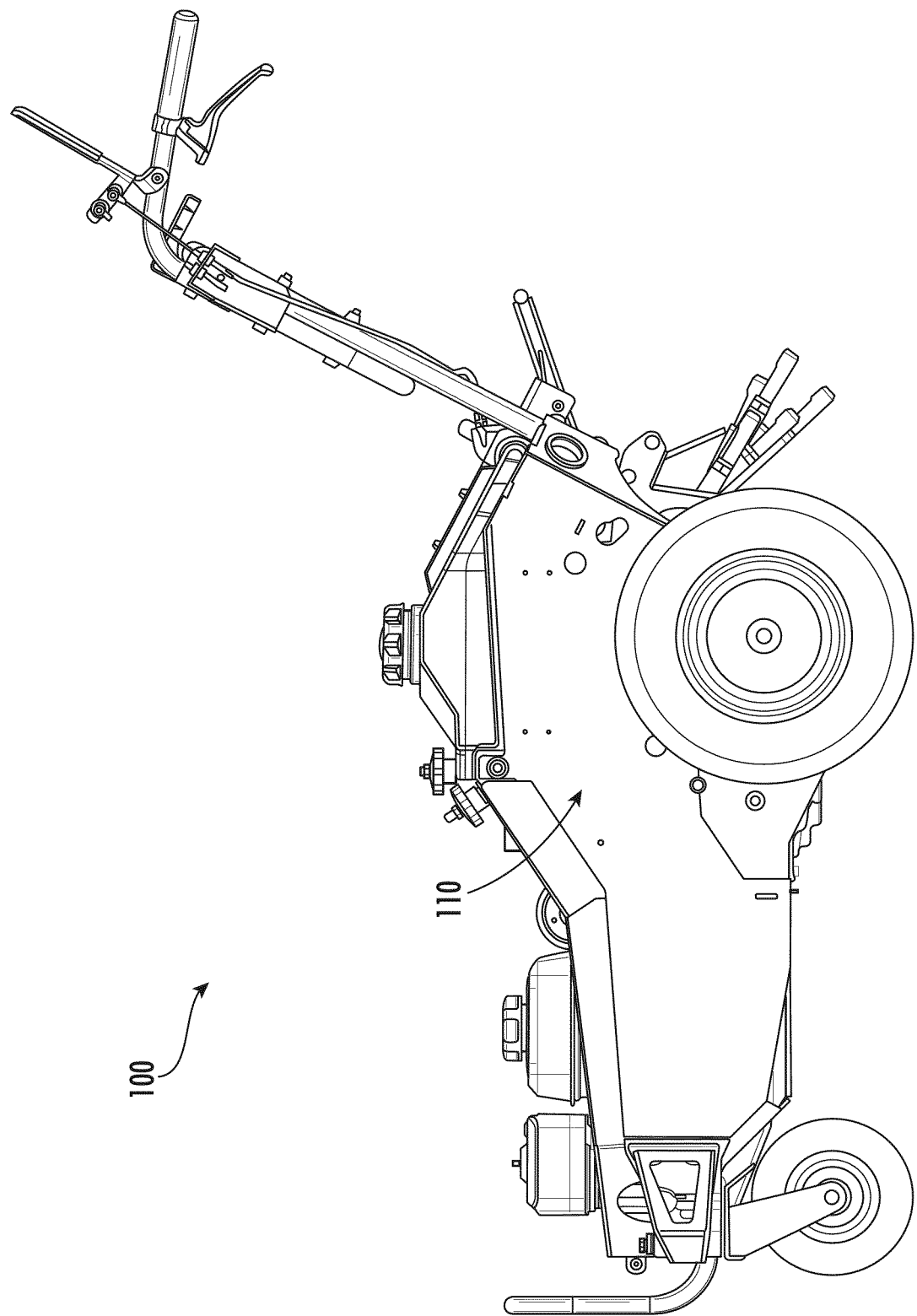
FIGS. 3A and 3B ire opposite side views of the aerator of FIG. 1.
Figure 3B:
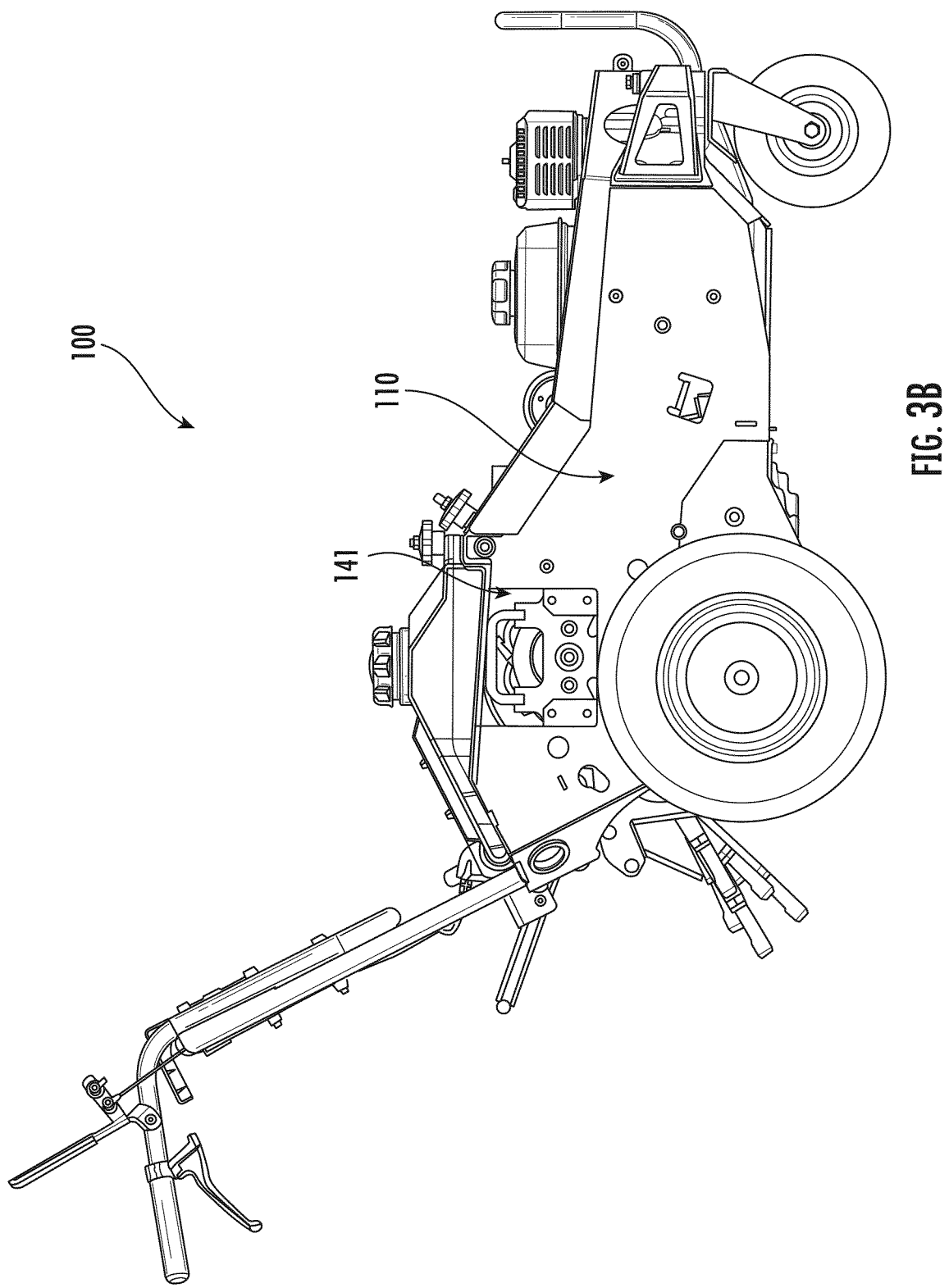

FIGS. 1 through 11 show a turf aerator according to one embodiment 100 of the current disclosure. The aerator 100 includes a frame 110 with front and rear ends 110a, 110b and a plurality of wheels 112 operatively coupled to the frame 110. The frame 110 may include various support components, such as plates, supports, brackets, et cetera. Two front wheels 112a and two rear wheels 112b are shown in the drawings, though more or fewer wheels 112 may be included. As is known in the art, the wheels 112 may be powered.

Figure 4:
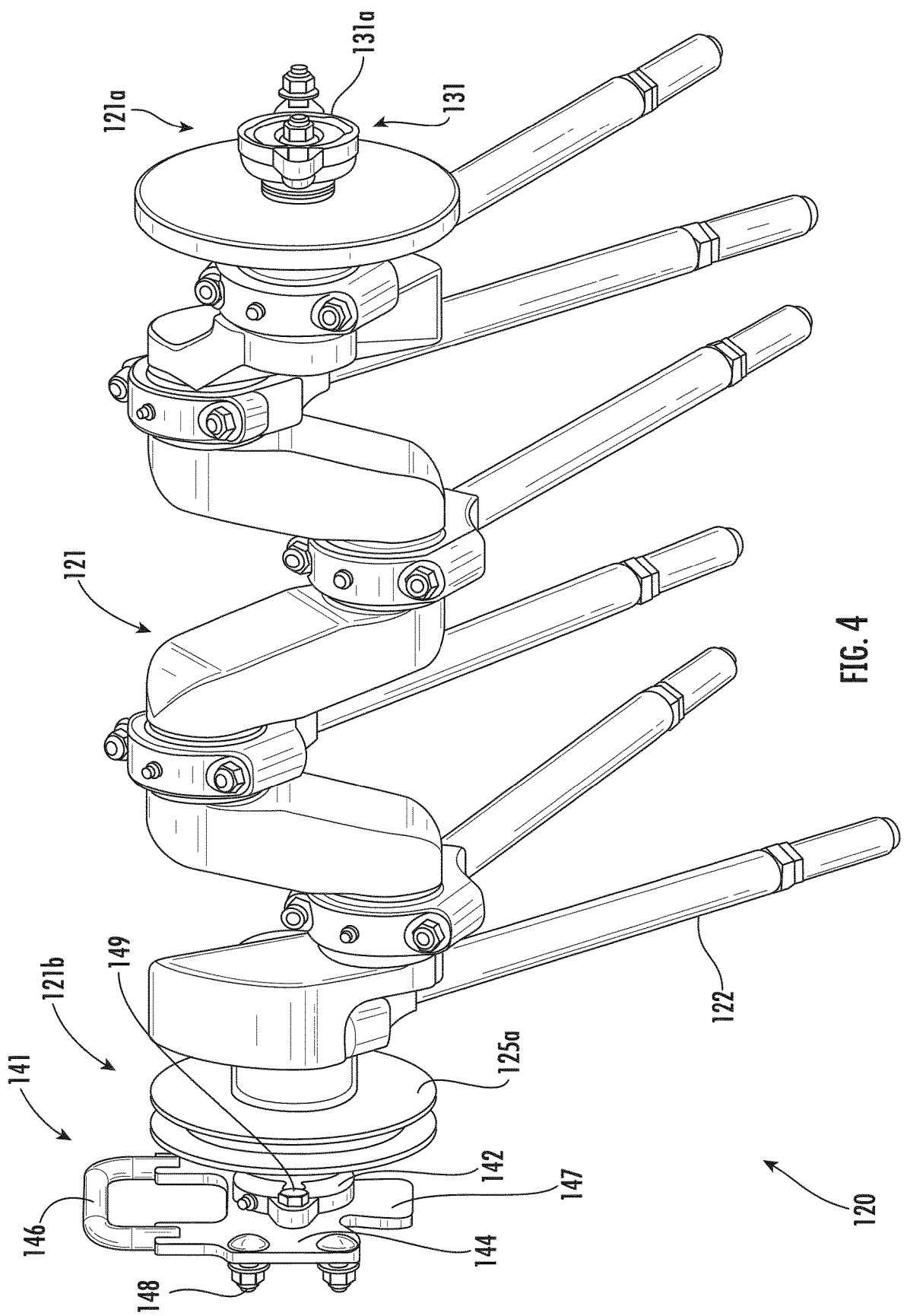
FIG. 4 is a perspective view of part of the aerator of FIG. 1.
Figure 5:
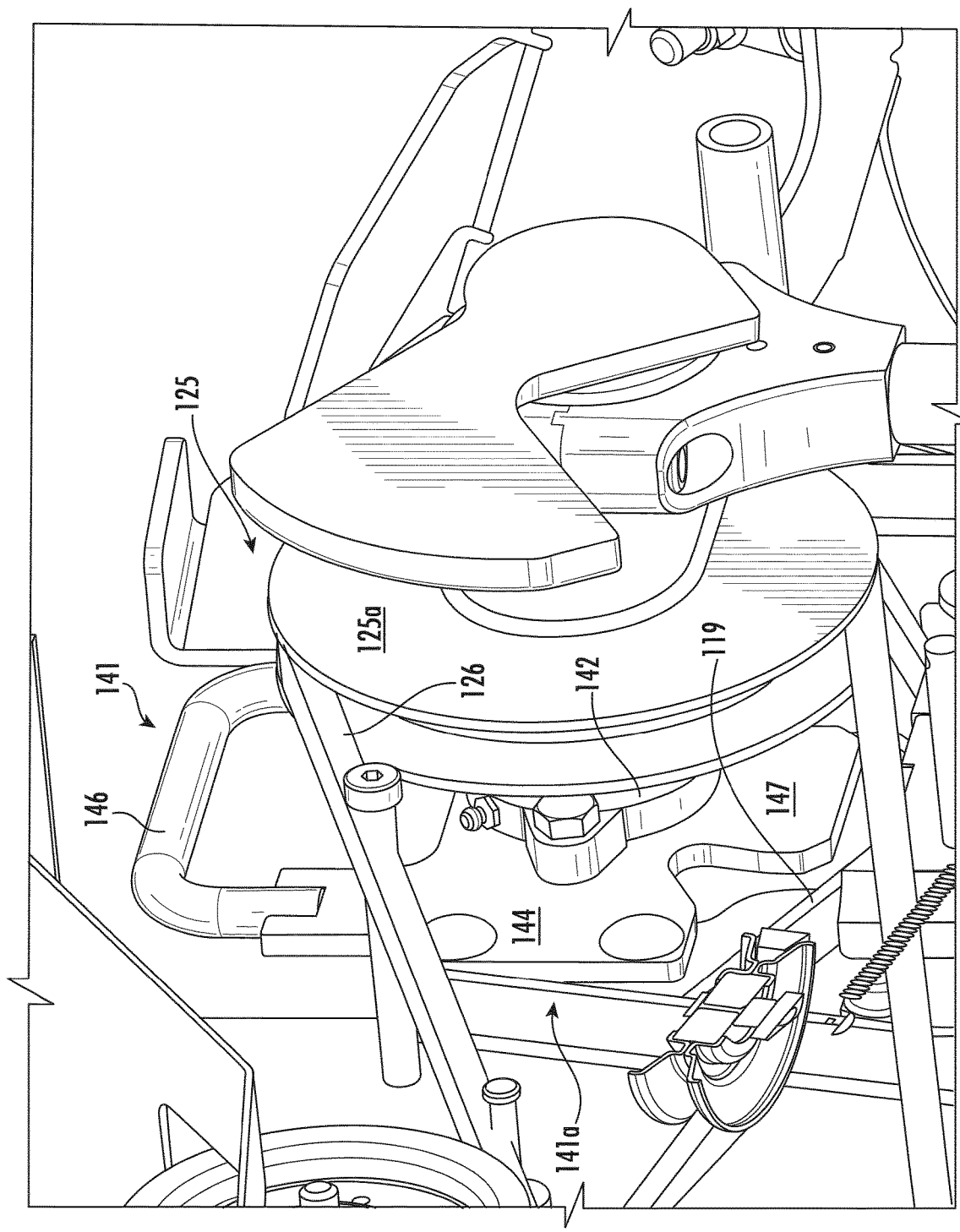
FIG. 5 is another perspective view of part of the aerator of FIG. 1.
Figure 6:
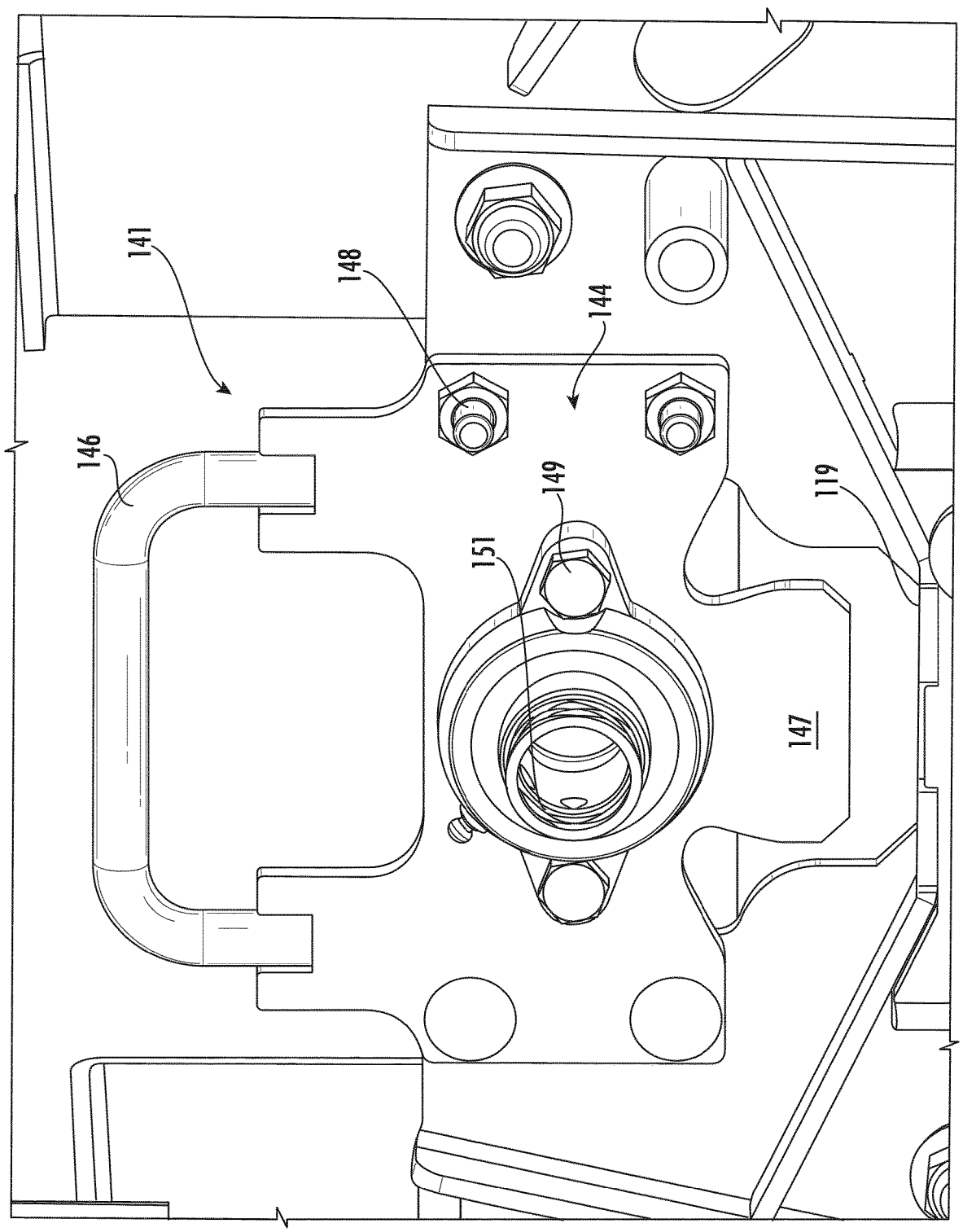
FIG. 6 is another perspective view of part of the aerator of FIG. 1.
Figure 7:
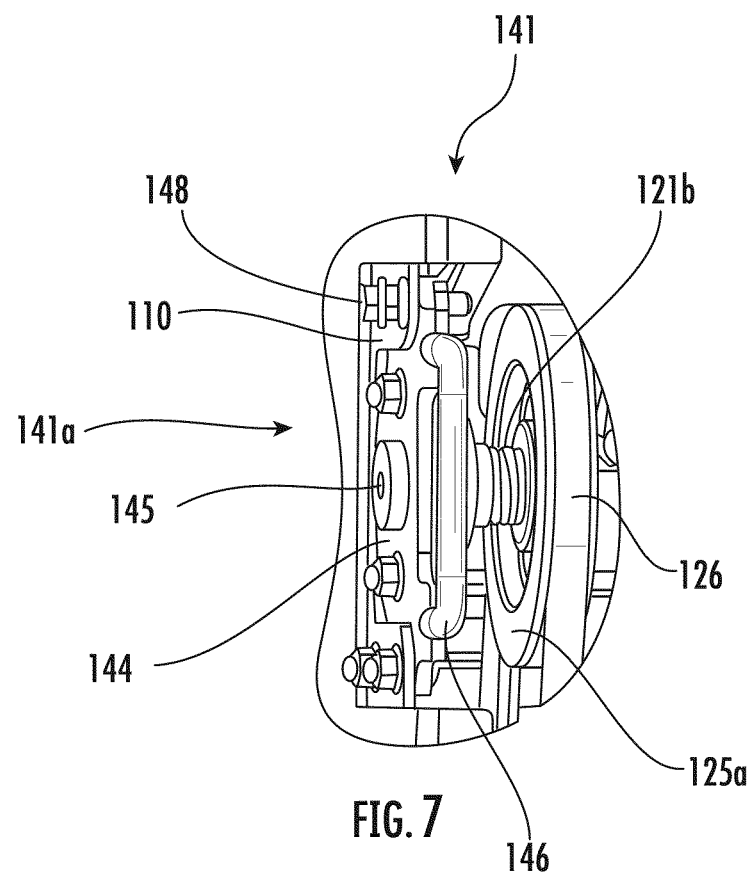
FIG. 7 is a perspective view from above of part of the aerator of FIG. 1, shown with the coupling at an operating position.
Figure 8:
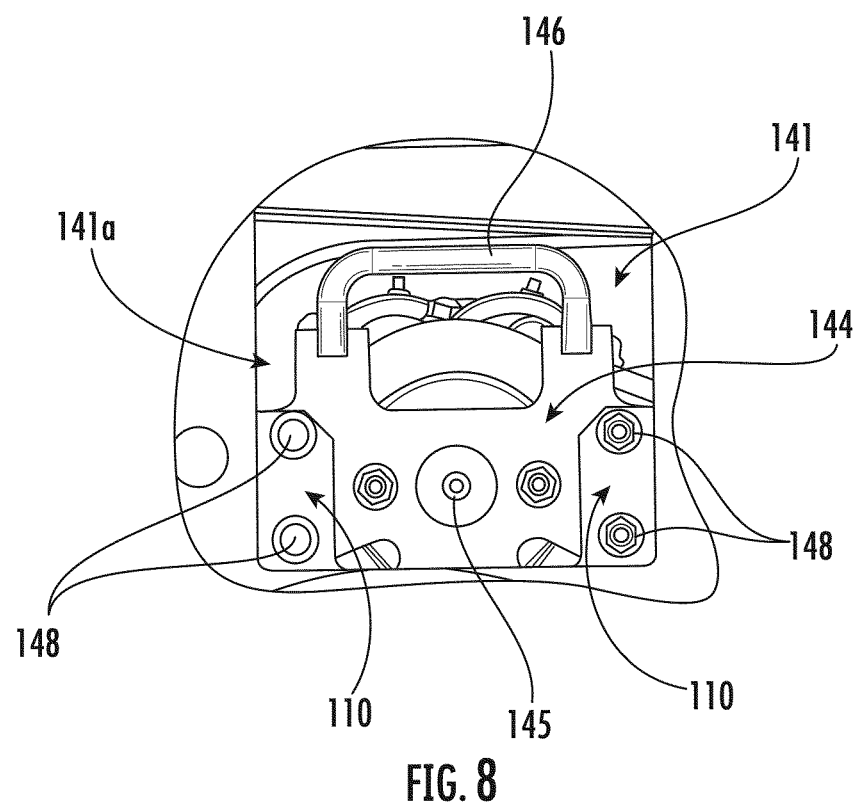
FIG. 8 is a side view of part of the aerator of FIG. 1, shown with the coupling at the operating position.

A tine assembly 120, best shown in FIG. 4, broadly includes a tine crank 121 having a pivoting end 121a and clearing end 121b, a plurality of tines 122 coupled to the tine crank 121, a drive mechanism 125 for rotating the tine crank 121 (and thus moving the tines 122), a joint 131 for fastening the pivoting end 121a to the frame 110, and a coupling 141 for fastening the clearing end 121b to the frame 110. The tines 122 may be any desired aerating tines, whether now know or later developed, which may be coupled to and operated by the tine crank 121. And the drive mechanism 125 may, for example, be a pulley 125a in a belt-and-pulley subsystem or a sprocket in a chain-and-sprocket subsystem. "Belt" is used herein to refer generically to both belts and chains unless specified otherwise or inherently otherwise, and "pulley" is used herein to refer generically to both pulleys and sprockets unless specified otherwise or inherently otherwise. In the embodiment 100, the pulley 125a is coupled to the tine crank 121 and powered by belt 126, which is in turn powered by an engine or motor. In prior art aerators, replacing belts is typically a burdensome endeavor that takes a substantial amount of time and energy. Replacing the belt 126 in the aerator 100, however, may be substantially quicker and easier.

The joint 131 fastens the pivoting end 121a to the frame 110 in a manner that allows the tine crank 121 to both rotate about an axis of the tine crank 121 and pivot relative to the frame 110. The joint 131 may Include, for example, a self-aligning ball bearing assembly 131a (as shown, in FIG. 4), a ball and socket coupling, a universal joint, or another appropriate joint, whether now known or leer developed.

The coupling 141 has a collar area 142 for receiving the clearing end 121b of the tine crank 121, an anchor plate, 144 for fastening to the frame 110, a handle 146 for positioning the anchor plate 144, a foot 147, and bolts 148. The clearing end 121b of the tine crank 121 has internal threads 151 (FIG. 6) along the axis of the tine crank 121, and the coupling 141 has an opening 145 (FIG. 8) sized for accessing the tine crank threading 151. The collar area 142, the handle 146, and the foot 147 may be defined by and/or coupled to the anchor plate 144. In the embodiment 100, the collar area 142 is coupled to the anchor plate 144 by bolts 149, the handle 146 is welded to the anchor plate 144, and the foot 147 is defined by the anchor plate 144. The foot 147 is configured to sit upon a ledge 119 (FIGS. 5 and 6) of the frame 110 when the anchor plate 144 is unfastened from the frame 110. And while four bolts 148 are shown in the drawings for selectively coupling the anchor plate 144 to the frame 110, more or fewer fasteners may be used.

An actuator 160 has threads complementary to the tine crank threading 151 for selectively moving the coupling 141 from an extended (or "operating") position 141a relative to the tine crank 121 to a retracted position 141b relative to the tine crank 121. More particularly, by threading the actuator 160 into the tine crank threading 151, a head 162 of the actuator 160 (either directly or through a washer or other intermediate element) imparts a force on the coupling 141 and causes the coupling 141 to be drawn to the retracted position 141b. In some embodiments, the actuated 160 may be one or more of the bolts 148. This may be particularly useful, as it may help minimize the number of parts in the aerator 100 and also serve to remind the user to remove the bolts 148 from coupling the anchor plate 144 to the frame 110 before the coupling 141 is moved to the retracted position 141b.

Figure 9:
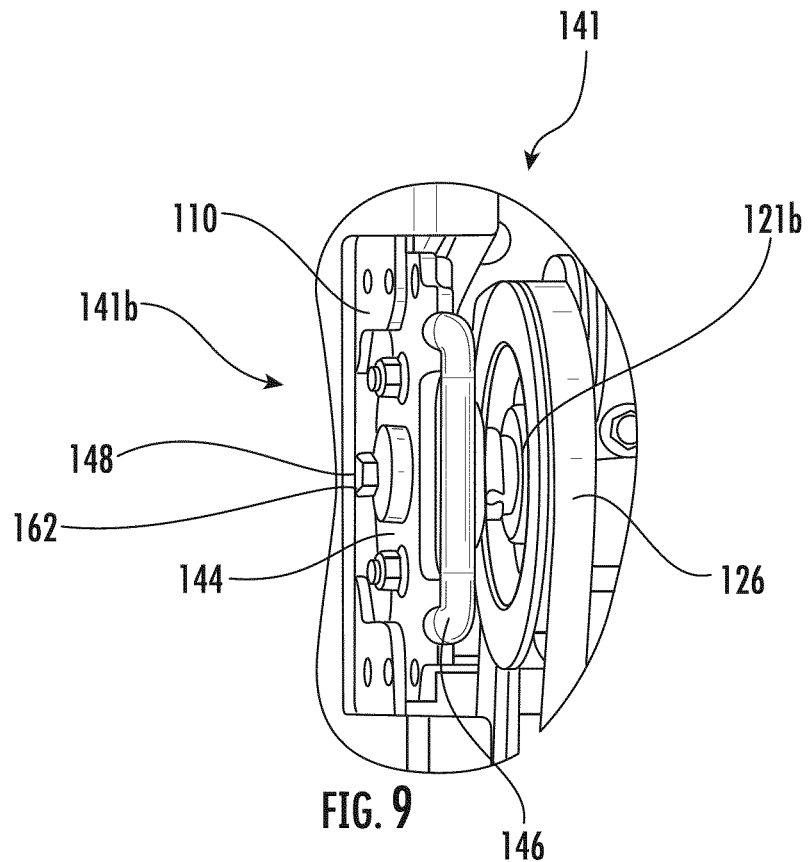
FIG. 9 is a perspective view from above of part of the aerator of FIG. 1, shown with the coupling at a retracted position.
Figure 10:
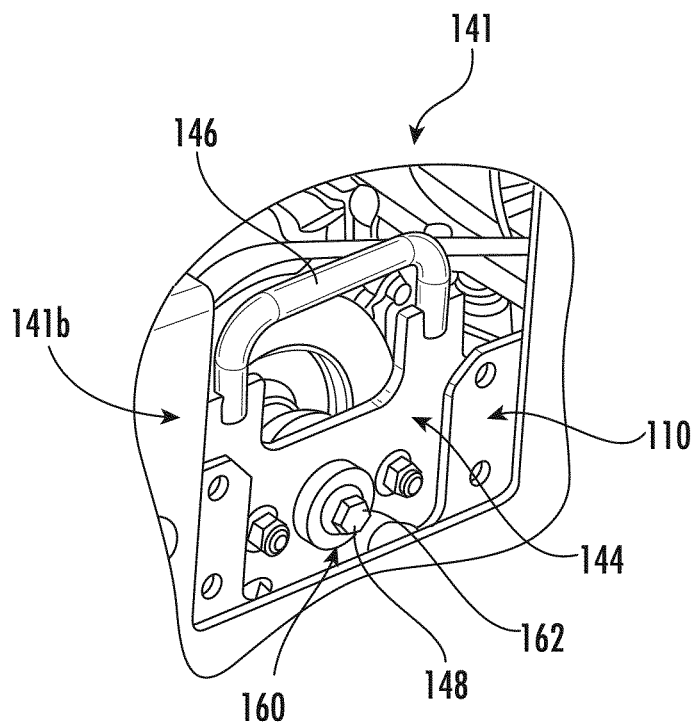
FIG. 10 is another perspective view of part of the aerator of FIG. 1, shown with the coupling at the retracted position.
Figure 11:
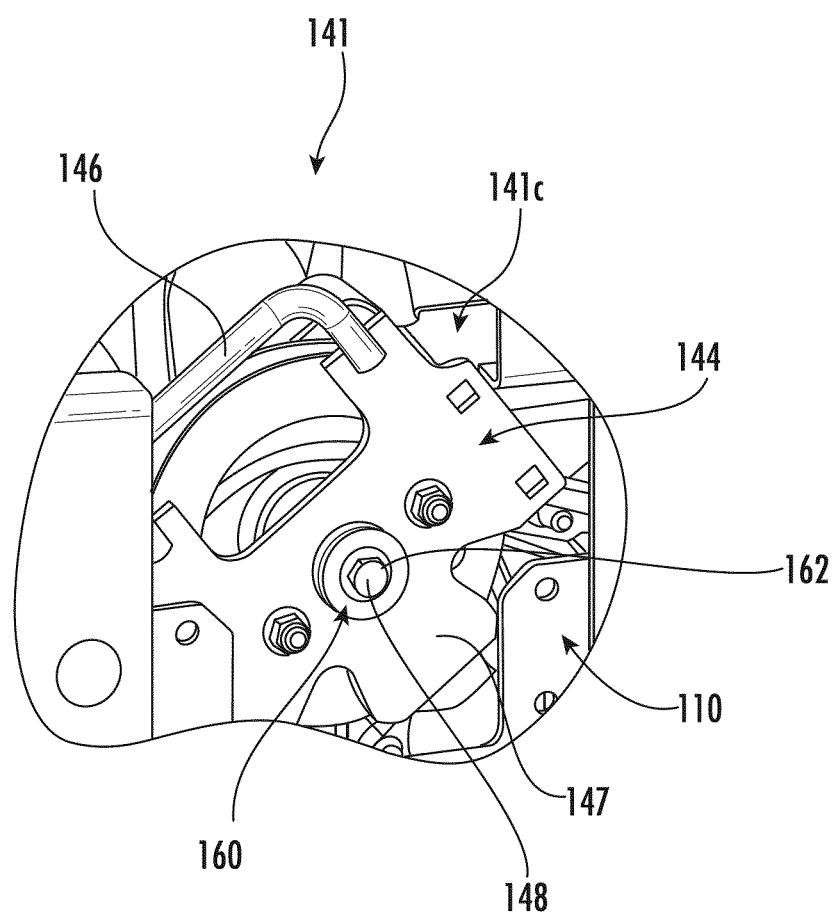
FIG. 11 is a perspective view of part of the aerator of FIG. 1, shown with the coupling at a clearance position.

In use, the coupling 141 is initially at the operating position 141a (FIGS. 5 through 8), with the bolts 148 fastening the anchor plate 144 to the frame 110. The clearing end 121b of the tine crank 121 is supported by the collar area 142, and movement of the belt 126 rotates the pulley 125a to turn the tine crank 121 and move the tines 121 into and out of the ground. Over time, the belt 126 may need serviced or replaced for various reasons. To remove the belt 126, the engine or motor is turned or maintained off such that the belt 126 is not powered. The bolts 148 are then removed, freeing the anchor plate 144 from the frame 110, the foot 147 rests on the ledge 119, and one of the bolts 148 (acting as the actuator 160) is threaded into the tine crank threading 151 through the opening 145. As the actuator 160 is fed into the tine crank threading 151, the actuator head 162 draws the coupling 141 to the retracted position 141b (FIGS. 9 and 10). With the anchor plate 144 loose from the frame 110, it may be relatively easy to remove the belt 126 from the pulley 125a, and the belt 126 may be passed through the gap between the coupling 141 and the frame 110 created by separating the anchor plate 144 from the frame 110. To increase that gap, the coupling 141 may be rotated to a clearance position 141c by gripping and turning the handle 146, as shown in FIG. 11.

To install the belt 126, the coupling 141 is moved to the retracted position 141b or to the clearance position 141c as provided above, and the belt 126 is passed through the gap between the coupling 141 and the frame 110 and installed on the pulley 125a. The actuator 160 is backed out of the tine crank threading 151 and the opening 145, allowing the anchor plate 144 to be positioned adjacent the frame 110, and the anchor plate 144 is coupled to the frame 110 by the bolts 148.

Conventionally, the crankshaft must be removed from the machine to service or replace the belt. Because the crankshaft can weigh up to approximately 80 pounds, an operator typically will use a hoist the crankshaft up and out of the machine. In some cases, more than one operator is necessary to complete a belt servicing or replacement. Using the belt servicing methods described herein, the crankshaft does not need to be removed from the machine. An operator performing a belt servicing as described herein merely needs to pivot the tine crank to remove and replace the belt. As such, an operator can complete belt servicing without the help of a hoist or another operator. The belt servicing methods described herein, therefore, may also provide a safer, more effective way of changing or servicing belts.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A turf aerator, comprising:
a frame;
a tine crank having a clearing end with threads;
a plurality of tines coupled to the tine crank;
a coupling for fastening the tine crank clearing end to the frame, the coupling comprising:
    a collar area for receiving the tine crank clearing end;
    an anchor plate for selectively fastening to the frame; and
    an opening sized for accessing the threads of the tine crank clearing end; and
an actuator threaded complementary to the threads of the tine crank clearing end for selectively moving the coupling from an extended position relative to the tine crank to a retracted position relative to the tine crank.

2. The turf aerator of claim 1, wherein the tine crank has a pivoting end opposite the clearing end, and wherein a joint fastens the tine crank pivoting end to the frame such that the tine crank is rotatable about an axis of the tine crank and pivotable relative to the frame.

3. The turf aerator of claim 2, wherein the threads of the tine crank clearing end are internal threads.

4. The turf aerator of claim 3, wherein the frame has a ledge and the coupling has a foot configured to rest or the ledge when the anchor plate is unfastened from the frame.

5. The turf aerator of claim 1, wherein the threads of the tine crank clearing end are internal threads.

6. The turf aerator of claim 1, wherein the frame has a ledge and the coupling has a foot configured to rest on the ledge when the anchor plate is unfastened from the frame.

7. The turf aerator of claim 1, wherein the actuator is a bolt that selectively couples the anchor plate to the frame.

8. The turf aerator of claim 1, wherein the coupling has a handle.

9. The turf aerator of claim 1, wherein the collar area is coupled to the anchor plate.

10. The turf aerator of claim 1, wherein the collar area is defined by the anchor plate.

11. A turf aerator, comprising:
a frame;
a tine crank having a clearing end with internal threads;
a plurality of tines coupled to the tine crank;
a coupling for fastening the tine crank clearing end to the frame, the coupling comprising:
    a collar area for receiving the tine crank clearing end;
    an anchor plate for selectively fastening to the frame; and
    an opening sized for accessing the threads of the tine crank clearing end;
and a bolt threaded complementary to the threads of the tine crank clearing end for selectively moving the coupling from an extended position relative to the tine crank to a retracted position relative to the tine crank.

12. The turf aerator of claim 11, wherein the tine crank has a pivoting end opposite the clearing end, and wherein a joint fastens the tine crank pivoting end to the frame such that the tine crank is rotatable about an axis of the tine crank and pivotable relative to the frame.

13. The turf aerator of claim 12, wherein the joint comprises at least one of a self-aligning ball bearing assembly, a ball and socket coupling, and a universal joint.

14. The turf aerator of claim 11, wherein the frame has a ledge and the coupling has a foot configured to rest on the ledge when the anchor plate is unfastened from the frame.

15. A tine assembly for use in a turf aerator, the tine assembly comprising:
a tine crank having a clearing end with threads and an opposite pivoting end;
a coupling for fastening the tine crank clearing end to a frame of the turf aerator, the coupling comprising:
    a collar area for receiving the tine crank clearing end;
    an anchor plate for selectively fastening to the frame; and
    an opening sized for accessing the threads of the tine crank clearing end; and
an actuator threaded complementary to the threads of the tine crank clearing end for selectively moving the coupling from an extended position relative to the tine crank to a retracted position relative to the tine crank.

16. The tine assembly of claim 15, further comprising a plurality of tines coupled to the tine crank.

17. The tine assembly of claim 15, further comprising a joint for fastening the tine crank pivoting end to the frame such that the tine crank is rotatable about an axis of the tine crank and pivotable relative to the frame.

18. The tine assembly of claim 17, wherein the joint comprises at least one of a self-aligning ball bearing assembly, a ball and socket coupling, and a universal joint.

19. The tine assembly of claim 15, wherein the coupling has a handle.

20. The tine assembly of claim 15, wherein the threads of the tine crank clearing end are internal threads.

* * * * *